Oct. 29, 1935.   E. H. LAND   2,018,963
PHOTOGRAPHIC APPARATUS AND METHOD OF PHOTOGRAPHY
Filed March 13, 1934
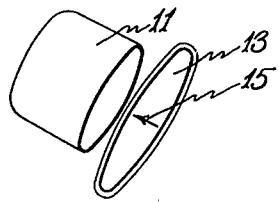
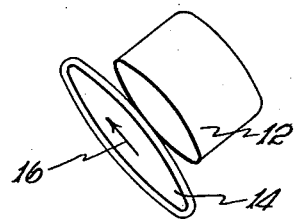
Fig. 1.
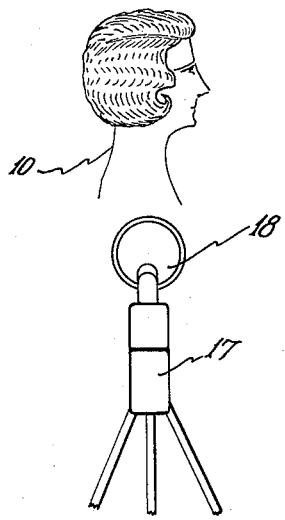
Fig. 2.
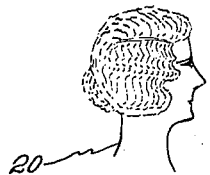
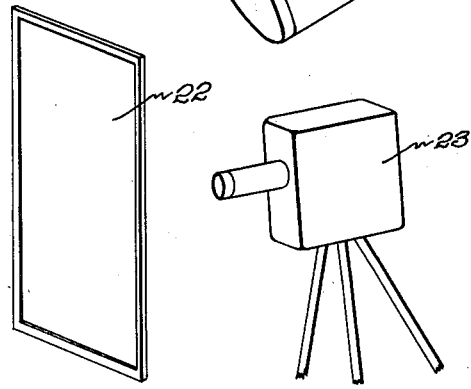
INVENTOR
Edwin H. Land
BY Warfield & Brown
ATTORNEYS Patented Oct. 29, 1935

2,018,963

UNITED STATES PATENT OFFICE 2,018,963

PHOTOGRAPHIC APPARATUS AND METHOD OF PHOTOGRAPHY

Edwin H. Land, Wellesley Farms, Mass., assignor to Sheet Polarizer Company, Inc., Union City, N. J., a corporation of New Jersey Application March 13, 1934, Serial No. 715,265

7 Claims. (Cl. 95—5)

This invention relates to an improved photographic apparatus and an improved method of photography. It has for its object broadly the provision of apparatus to control specularly reflected light from the object photographed, and the provision of a method whereby such specularly reflected light may be controlled.

A further object of the invention is to provide means for illuminating the object to be photographed either wholly or in part by polarized light, and means for photographing the object so illuminated through a polarizing screen which may be adjustably positioned with respect to the photographic apparatus and the source of polarized illumination so as to control the intensity of light specularly reflected from the object photographed and impinging on the photographic negative.

A further object of the invention is to provide a method and means for illuminating an object to be photographed, either in whole or in part, with plane-polarized light, and for photographing the said object through a light-polarizing element of the character of that employed in connection with the source of illumination.

A still further object of the invention is to provide means and a method to illuminate objects to be photographed with circularly polarized light and for photographing the said object through a light-polarizing element of the character of that employed in connection with the source of illumination.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing, in which:

Figure 1 is a diagrammatical representation of an embodiment of the invention employing plane-polarized light; and Fig. 2 is a diagrammatical representation of an embodiment of the invention in which circularly polarized light is employed.

Heretofore, in photography generally, and more especially in certain aspects of commercial photography and moving picture photography, it has been difficult to secure smoothly lighted reproductions of the objects photographed because of the prevalence of shine or highlights, or more technically, specular reflection, from the surfaces of the objects photographed. This specular reflection may be frequently of aid in imparting the desired effect to the reproduction of the object photographed, as, for example, where highlights on the surfaces of glassware, crockery, etc., are desired, or where the shine or highlight from a moistened surface is desired. In the great majority of cases, however, where highlights are not desired in the reproduction of the photographed object, or where faint highlights only are desired, the presence of specular glare from the surface of the object to be photographed is a distinct handicap to the photographer. In certain cases the difficulty encountered because of the presence of specular glare reaches major proportions. For example, where it is desired to photograph a picture which has been framed behind glass, it is frequently practically impossible to adequately illuminate the picture without at the same time creating detrimental specular glare from the surface of the protecting glass sheet. Furthermore, in ordinary studio photography, it is frequently found that the most satisfactory illumination of the subject is one which creates undesirable highlights or areas of relatively intense specular reflection.

This invention contemplates the provision of means for controlling or even eliminating the specularly reflected light from the object to be photographed. The control of the specularly reflected light with relation to the diffused light from the object may include a control from a minimum of specular reflection approximating complete elimination to an actual doubling of the relative intensity of the specularly reflected light with respect to the diffused light. Using apparatus such as is hereafter described, the photographer may increase or diminish the effect of the highlights or shiny portions of the object photographed at will. He may completely eliminate the specularly reflected lights or highlights and obtain a photograph from the diffused light only.

In the embodiment of the invention shown in Fig. 1, 10 represents an object to be photographed, 11 and 12 represent sources of illumination, 13 and 14 represent plane-polarizing elements interposed in the path of the beams emanating from the sources of illumination and adapted to polarize those beams. As shown, the element 13 is positioned with its polarizing axis, illustrated by the arrow 15, extending horizontally across the direction of the projection of the beam from the light source 11, and the polarizing element 14 is positioned with its polarizing axis, illustrated by the arrow 16, at right angles to that of the element 13. It will be understood that the polarizing elements are intended to be rotatively mounted with respect to their associated light sources to the end that their polarizing axes may be parallel or at right angles to each other, or at any desired angle to each other and to the vertical.

It is to be understood further that although a plurality of light sources and associated polarizing elements are shown, only one such light source need be employed, and that any desired number may be used. Where large scenes are photographed, for example, a multiplicity of light sources may be employed and the polarizers associated with each may be adjusted in a manner hereinafter to be explained to control accurately the extent of specularly reflected light obtained from the objects illuminated by each of said sources.

In Fig. 1, 17 represents the photographic camera, and 18 represents a cooperating light-polarizing element adapted to plane-polarize light. This element may preferably be mounted rotatively with respect to the camera 17.

The operation of the device shown in Fig. 1 is as follows: The object to be photographed is illuminated by the plane-polarized light emanating from the light sources. As shown, half the object will be illuminated with polarized light vibrating in a vertical plane and half with polarized light vibrating in a horizontal plane. It will of course be obvious that by adjusting the polarizing elements associated with the sources of illumination the entire object may be illuminated by similarly polarized light, or such portions of it or of the scene photographed may be similarly illuminated as in the judgment of the photographer may be desirable. The polarized light striking the object to be photographed and diffusely reflected therefrom is depolarized and passes the light-polarizing element associated with the camera irrespective of the position of that element. Such of the light, however, as illuminates the object to be photographed and as is specularly reflected therefrom is not depolarized, but retains the charcteristic imparted to it by the light-polarizing element associated with the light source from which it emanated. This light may be passed or blocked by the light-polarizing element associated with the camera at the will of the photographer by rotating that element until its polarizing axis is parallel with or at right angles to the plane of vibration of the specularly reflected light.

It will be obvious that when the polarizing axis of the element associated with the camera is parallel to the plane of vibration of the specularly reflected light, it passes that light, and when its axis is at right angles to that plane of vibration it blocks that light. At intermediate positions it may block more or less of the specularly reflected light, depending upon the position of its polarizing axis with respect to the plane of polarization of the specularly reflected beam.

The diffuse light reflected from the object to be photographed passes the polarizing element associated with the camera but with an effective diminution in intensity. The specularly reflected light from the object to be photographed passes the polarizing screen associated with the camera without any effective diminution in its intensity where the plane of the vibration of the specularly reflected beam is parallel to the polarizing axis of the polarizing element. It will be obvious that under these circumstances the specularly reflected light reaches the camera with a substantially greater relative intensity than does the diffuse light. This may approximate a 100% increase in the ratio of intensities as a maximum.

The particular embodiment of the invention shown in Fig. 1 is one in which the highlights reflected from the object to be photographed may be shifted at will by the photographer from one side to the other by altering the position of the screen 18. For example, when the screen is positioned with its polarizing axis vertical, the specularly reflected light from the light source 12 will be transmitted without loss and the highlights on that portion of the object illuminated from said source will be intense. At the same time, the specularly reflected light from the source 11 will be completely blocked by the element 18 and no highlights will appear on that portion of object illuminated by said source. As the element 18 is rotated so that its polarizing axis is horizontal, the highlights on that portion of the element illuminated from the source 12 will decrease in intensity until they are eliminated, while those on that portion of the object illuminated by the source 11 will increase in intensity until they reach a maximum.

In Fig. 2 a modification of the invention is shown in which an object to be photographed 20 is illuminated from a source 21 by light passing through an element 22 adapted to circularly polarize the transmitted beam. As shown, the element 22 is large enough to cover not only the light source 21 but the photographic camera 23, so that the light passes from the source 21 through the circularly polarizing element 22, strikes the object to be illuminated, and is reflected back through the circularly polarizing element 22 to the camera 23. With such an apparatus the specularly reflected light from the object 20 is blocked by the element 22, and the image on the photographic film is obtained solely from the diffuse reflected light.

The element 22 may comprise a light-polarizing element and a cooperating quarter wave element which may be adhesively affixed to the light-polarizing element itself, if desired. The polarizing element should be positioned between the quarter wave element and the source of illumination. It will of course be obvious that a plurality of sources of illumination may be employed with circularly polarizing screens interposed in the path of the beams emanating from said sources and with a circularly polarizing screen interposed in front of the camera lens in the manner, for example, as is shown in Fig. 1.

Where circularly polarized light is employed, it is not necessary to adjust the positions of the polarizing screens with respect to each other, for a screen adapted to circularly polarize a transmitted beam is opaque to that beam when it is specularly reflected. It follows that if similar screens are employed over all the light sources and the camera lens, all the highlights or specularly reflected glare from the object to be photographed will be eliminated. It is to be understood that circularly polarized light may have either clockwise vibration or counterclockwise vibration, depending upon the position of the axis of the quarter wave device with respect to the polarizing axis of its associated polarizing element. It is to be understood that similar screens are to be employed throughout the entire system if specular glare is to be eliminated, i. e., that only screens adapted to pass clockwise circularly polarized light, or only screens adapted to pass counterclockwise circularly polarized light should be employed. If it is desired to increase the highlight or specular glare intensity, it will be understood that opposite types of screens should be employed, i. e., a clockwise circularly polarizing screen and a counterclockwise circularly polarizing screen, one with the light source, the other with the camera.

Suitable polarizing elements for use in connection with the apparatus described may comprise set suspensions of polarizing particles in transparent suspending media. The polarizing axes of the particles in the suspension should be aligned in parallelism. Any polarizing particles may be employed, such for example as particles of herapathite or of purpureocobaltchloridesulphateperiodide, or particles of anilinesulphateperiodide. Suitable suspending media may comprise nitrocellulose or cellulose acetate, or any light-transparent set medium in which the particles may be introduced and distributed, as shown, for example, in the issued patent to Land and Friedman No. 1,918,848. It will be obvious also that other light-polarizing elements may be employed which are well known in the art. Elements of the type described are to be preferred, however, for they are easy to manufacture durable, easily adjusted and mounted, and may be produced in large sheets. In addition, polarizers of the type described have an unlimited angular aperture, which is of considerable importance in certain classes of photography.

The quarter wave plates employed in connection with the polarizers where circularly polarized light is desired may comprise any device which introduces a quarter wave retardation to one component of the transmitted beam with respect to the other, such for example as a suitable double refracting material or a Fresnel rhomb. A preferred quarter wave plate may comprise a set sheet of oriented cellulose or cellulosic material of such thickness as to impart a quarter wave retardation. A set suspension of suitable double refracting particles properly oriented in the suspending medium may, in certain circumstances, also be employed.

It is to be understood that when circularly polarized light is desired, the quarter wave plate is to be positioned with its axis at 45° to the polarizing axis of the light-polarizing element associated with it. The light-polarizing element should be positioned between the quarter wave plate and the source of light, and also between the quarter wave plate and the camera lens.

While only two methods of employing polarized light have been expressly described,—a method employing plane-polarized light and a method employing circularly polarized light, it is to be understood that any elliptically polarized light, including plane-polarized light and circularly polarized light as special cases, may be employed, and that it is within the scope of this invention to employ emitting screens and screens cooperating with the camera lenses adapted to utilize elliptically polarized light. With circularly polarized light a suitable camera lens screen may be opaque to specularly reflected light emitted from a correspondingly suitable emitting screen, irrespective of the positions of their respective axes. With plane-polarized light, the camera screen will be opaque to specularly reflected light emitted from a corresponding emitting screen only when the polarizing axes of the two screens are at right angles to each other. Where elliptically polarized light other than plane-polarized or circularly polarized light is employed, results may be obtained intermediate those described in connection with the use of plane and circularly polarized light.

The applications of the invention herein described are widespread. Not only is it useful in ordinary studio photography, but it is also of very great use in connection with such reproducing work as is common in photolithography and similar arts. It has a widespread application in connection with the production of motion pictures, and especially in connection with reproduction of animated motion picture cartoons. A device such as shown, for example, in Fig. 2 may be advantageously employed in connection with show window display, for if a screen of circularly polarizing material is interposed between the objects of display and the viewer of the window, and is illuminated from outside in the manner shown in Fig. 2, all specular glare will be eliminated and the observer will see the objects illuminated only by means of the soft, diffuse light.

Another application of the invention is its use in connection with searchlights at sea. If the beam emanating from the searchlight is polarized and the observer views the illuminated surface of the water through a suitable polarizing screen, he can eliminate all specular glare. Inasmuch as most of the reflected light from the surface of the water is specularly reflected, the result is that the observer can much more readily see the object on which the searchlight is playing, for the glare from the water is practically eliminated.

Still another application of the invention is its use in connection with reading or other optical work under artificial light. If a polarizing screen is interposed between the light source and the object viewed, and if the observer wears suitable polarizing glasses, for example, or views the object through a second polarizing screen positioned so as to cut off specular glare in the manner outlined above, all the glare from the book or other object observed will be eliminated and eyestrain and fatigue substantially decreased. It is frequently impossible to eliminate glare from an object viewed under conditions outlined where polarizing screens are not employed for the reason that each eye of the observer views the object at a different angle so that adjustments which eliminate or reduce the glare to one of the eyes of the user frequently fail to reduce the glare to the other eye. Furthermore, the glare for each eye of the observer is from a different part of the object being observed, and the unconscious effort to fuse the bright spots on the object results in a very considerable eyestrain.

It has been found also that systems such as are herein described are especially effective in photographing or viewing colored objects. The light reflected from the surface of most colored objects, without absorption thereby, is not changed in color. It is only the light which actually penetrates into the surface of the object, is partly absorbed thereby and then diffused out, which is changed in color. With the use of polarizing screens such as have been described, it is possible to brightly illuminate the object to be photographed or viewed and to then eliminate all the unchanged surface-reflected light, leaving only the light changed in color. The result is to give a strongly saturated color effect which it is quite impossible to produce by any other means. It will be obvious that the amount of unchanged surface-reflected light received may be controlled to effect the apparent color saturation desired.

The operation of the apparatus described will be obvious. The object to be photographed is illuminated with polarized light. If highlights are desired, the screen adjacent the camera is so adjusted as to pass all or part of the specularly reflected light. If highlights are to be eliminated, the screen adjacent the camera is adjusted to block specularly reflected light. If highlights are desired on one portion of the surface of the object to be photographed but not on the rest of the surface, the screens adjacent the light sources are so adjusted that when the screen adjacent the camera is positioned to block specularly reflected light from the surface where no highlights are desired, specularly reflected light from the surface where highlights are desired will pass the camera screen.

The apparatus shown in Fig. 2 is admirably adapted for use in connection with the illumination of oil paintings. It is common now to illuminate such paintings by lights positioned above and in front of the painting. If a suitable circularly polarizing sheet such as is shown in Fig. 2 be employed, positioned to cover the front of the painting, all specular glare from the surface of the painting itself will be removed and the painting will be much more easily viewed by an observer standing, for example, in front and below the painting.

Where polarizing elements in the systems heretofore described are employed which do not completely polarize all the visible band of the spectrum or all the region to which the photographic plate is sensitive, a suitable filter may be employed in connection with either the viewing glass or the camera lens to block that portion of the spectrum which is not polarized and to which the eye of the observer or the photographic plate is sensitive. It will be obvious that a similar result may be obtained if the photosensitive material is selected or sensitized to be sensitive only to those components of the illuminating beam which are polarized by the polarizing screens.

It is also to be understood that the following claims are intended to cover all the generic and specific features of the invention herein described, and all statements of the scope of the invention which, as a matter of language, might be said to fall therebetween.

Since certain changes in carrying out the above method and in the constructions set forth which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. In combination, a light source, means comprizing a polarizing element positioned in the path of a beam emanating from said source and adapted to circularly polarize said beam, an object to be illuminated by said beam, a camera, and an analyzer for circularly polarized light associated with said camera and adapted to block light specularly reflected from said object to said camera.

2. In combination, a plurality of light sources, means adjustably positioned with respect to each of said sources and comprising polarizing elements positioned in the paths of the beams emanating from said sources, a camera, and a light-polarizing element adjustably positioned in the path of beams transmitted by the lens of said camera whereby the intensity of light specularly reflected from all portions of said object illuminated from said sources to said camera may be controlled.

3. A device for photographing an object illuminated with polarized light which comprises a camera and light-polarizing means associated with said camera interposed in the path of beams of light reflected from said object to the lens of said camera, means for positioning said light-polarizing means rotatably with respect to said lens whereby the intensity of specularly reflected light transmitted to said lens as compared with diffused reflected light transmitted thereto may be controlled, said light-polarizing means being of such size and character that the effective angular aperture of said lens is not limited thereby.

4. In combination, a light source, light-polarizing means associated with said source for polarizing only a predetermined portion of the wave lengths of beams emanating from said source, a camera, light-polarizing means associated with said camera interposed in the path of beams transmitted by the lens of said camera, and a color filter interposed in the path of beams emanating from said source and transmitted through the lens of said camera for blocking substantially all wave lengths of said beams which are of a character to activate photosensitive material in said camera save said predetermined portion of said wave lengths.

5. In combination, means for illuminating an object with polarized light, a camera, a light-polarizing element interposed in the path of beams transmitted from said object through the lens of said camera, and photosensitive material within said camera for recording images transmitted to it by said beams, said photosensitive material being sensitive substantially only to those wave lengths in said beams which the light-polarizing elements polarize.

6. A photographic method comprising illuminating an object from a plurality of sources with polarized light having predeterminedly different characteristics and photographing the object so illuminated through a screen adapted to transmit light diffusely reflected from said object uniformly irrespective of the source of said light, and adapted to transmit light specularly reflected from said object in such a manner that light so specularly reflected will have a predetermined intensity dependent upon its source.

7. The method of photographing objects illuminated with light at least partially polarized which comprises causing the beams reflected from the object to be photographed to the camera lens to pass through a polarizing screen adapted for altering the intensity of specular reflection from said object, and causing the beams emanating from the light source to pass through a color filter at some point intermediate the light source and photosensitive material in the camera, said color filter adapted to block substantially all wave lengths of said beams which activate the photosensitive material employed in the camera and which are not polarized by said polarizing screen.

EDWIN H. LAND.